(12) United States Patent
Zhou et al.

(10) Patent No.: US 11,798,159 B2
(45) Date of Patent: Oct. 24, 2023

(54) SYSTEMS AND METHODS FOR RADIOLOGY IMAGE CLASSIFICATION FROM NOISY IMAGES

(71) Applicant: The Board of Trustees of the Leland Stanford Junior University, Stanford, CA (US)

(72) Inventors: Sharon Zhou, Stanford, CA (US); Andrew Y. Ng, Stanford, CA (US); Pranav Rajpurkar, Stanford, CA (US); Mark Sabini, Stanford, CA (US); Chris Wang, Stanford, CA (US); Nguyet Minh Phu, Stanford, CA (US); Amirhossein Kiani, Stanford, CA (US); Jeremy Irvin, Stanford, CA (US); Matthew Lungren, Stanford, CA (US)

(73) Assignee: The Board of Trustees of the Leland Stanford Junior University, Stanford, CA (US)

( * ) Notice: Subject to any disclaimer, the term of this patent is extended or adjusted under 35 U.S.C. 154(b) by 385 days.

(21) Appl. No.: 17/026,068

(22) Filed: Sep. 18, 2020

(65) Prior Publication Data
US 2021/0089840 A1    Mar. 25, 2021

Related U.S. Application Data

(60) Provisional application No. 62/903,564, filed on Sep. 20, 2019.

(51) Int. Cl.
*G06T 7/00* (2017.01)
*G06F 18/241* (2023.01)
(Continued)

(52) U.S. Cl.
CPC .......... *G06T 7/0012* (2013.01); *G06F 18/214* (2023.01); *G06F 18/241* (2023.01);
(Continued)

(58) Field of Classification Search
CPC .. G06K 9/6268; G06K 9/6256; G06T 7/0012; G06T 2207/10016; G06T 2207/10116;
(Continued)

(56) References Cited

U.S. PATENT DOCUMENTS

| | | | |
|---|---|---|---|
| 2009/0177495 A1 | 7/2009 | Abousy et al. | |
| 2018/0082115 A1* | 3/2018 | Itan | G06V 30/413 |

(Continued)

FOREIGN PATENT DOCUMENTS

| | | |
|---|---|---|
| CN | 107767935 A | 3/2018 |
| CN | 109188703 A | 1/2019 |

OTHER PUBLICATIONS

Zheng et al., "Improving the Robustness of Deep Neural Networks via Stability Training", arXiv, arXiv: 1604.04326v1, Apr. 15, 2016, 9 pgs. (Year: 2016).*

(Continued)

*Primary Examiner* — Van D Huynh
(74) *Attorney, Agent, or Firm* — KPPB LLP (57) ABSTRACT

Systems and methods for radiology image classification from noisy images in accordance with embodiments of the invention are illustrated. One embodiment includes noisy image classification device, including a processor, camera circuitry, and a memory containing a noisy image classification application, where the noisy image classification application directs the processor to obtain image data describing a first image taken of a second image using the camera circuitry, where the second image was produced by a medical imaging device, and where the first image is a noisy version of the second image, classify the image data using a neural network trained to be robust to noise, generate an investigation recommendation based on the classification, and provide the investigation recommendation via a display.

20 Claims, 9 Drawing Sheets

(51) Int. Cl.
    *G06F 18/214*    (2023.01)
    *G06V 10/25*     (2022.01)
    *G06V 10/764*    (2022.01)
    *G06V 10/774*    (2022.01)

(52) U.S. Cl.
    CPC ............ *G06V 10/25* (2022.01); *G06V 10/764* (2022.01); *G06V 10/774* (2022.01); *G06T 2207/10016* (2013.01); *G06T 2207/10116* (2013.01); *G06T 2207/20081* (2013.01); *G06T 2207/20084* (2013.01); *G06T 2207/30048* (2013.01)

(58) Field of Classification Search
    CPC . G06T 2207/20081; G06T 2207/20084; G06T 2207/30048; G06T 5/002; G06V 10/25; G06V 10/764; G06V 10/774
    USPC ........................................................ 382/128
    See application file for complete search history.

(56) References Cited

U.S. PATENT DOCUMENTS

| | | | |
|---|---|---|---|
| 2018/0144466 A1* | 5/2018 | Hsieh | G06T 7/0012 |
| 2019/0325269 A1* | 10/2019 | Bagherinezhad | G06F 18/241 |
| 2020/0065940 A1* | 2/2020 | Tang | G06F 18/214 |
| 2020/0074234 A1* | 3/2020 | Tong | G06V 10/774 |
| 2020/0234080 A1* | 7/2020 | Ciller Ruiz | G06T 5/002 |
| 2021/0177296 A1* | 6/2021 | Saalbach | A61B 5/7207 |

OTHER PUBLICATIONS

"Output Formats", Graphviz, Retrieved from: https://graphviz.gitlab.io/_pages/doc/info/output.html#d:gv, Printed on Aug. 10, 2018, 16 pgs.

Lungren, Matthew, "Live XRAY4ALL Demo", Retrieved from: https://www.youtube.com/watch?v=X81nBdKvI7s, Uploaded May 26, 2018, 1 pg.

Pasa et al., "Efficient Deep Network Architectures for Fast Chest X-Ray Tuberculosis Screening and Visualization", Scientific Reports, vol. 9, No. 6268, Published online Apr. 18, 2019, 9 pgs.

Zheng et al., "Improving the Robustness of Deep Neural Networks via Stability Training", arXiv, arXiv: 1604.04326v1, Apr. 15, 2016, 9 pgs.

* cited by examiner

SYSTEMS AND METHODS FOR RADIOLOGY IMAGE CLASSIFICATION FROM NOISY IMAGES

CROSS-REFERENCE TO RELATED APPLICATIONS

The present application claims the benefit of U.S. Provisional Application No. 62/903,564 filed Sep. 20, 2019, titled "Systems and Methods for Radiology Image Classification from Noisy Images", the entirety of which is hereby incorporated by reference.

FIELD OF THE INVENTION

The present invention generally relates to systems and methods for radiology image classification, and namely the classification of noisy images via machine learning.

BACKGROUND

Radiology is a branch of medicine that uses imaging technology to diagnose and treat disease. Radiology images (sometimes referred to as "medical images," or colloquially as the name of the machine used to obtain them) are obtained via medical imaging devices, such as, but not limited to, X-rays, Magnetic Resonance Imaging (MRI), Computed Tomography (CT), Positron Emission Tomography (PET), and many others. The resulting images are often printed to film or digitally presented to radiologists and other doctors to review in order to aid in diagnosing conditions that the imaged subject may have.

Neural networks are a class of machine learning techniques that are often used for image classification. Neural networks used for classification are trained using a set of annotated data, referred to as "training data", and ideally are able to identify newly presented images after training with a high degree of accuracy.

SUMMARY OF THE INVENTION

Systems and methods for radiology image classification from noisy images in accordance with embodiments of the invention are illustrated. One embodiment includes noisy image classification device, including a processor, camera circuitry, and a memory containing a noisy image classification application, where the noisy image classification application directs the processor to obtain image data describing a first image taken of a second image using the camera circuitry, where the second image was produced by a medical imaging device, and where the first image is a noisy version of the second image, classify the image data using a neural network trained to be robust to noise, generate an investigation recommendation based on the classification, and provide the investigation recommendation via a display.

In another embodiment, the neural network is a specialist neural network, and the specialist neural network was trained using a training device directed to obtain a ground truth set of image data, augment the ground truth set of image data, train a plurality of neural networks using the augmented set of image data, perform a calibration on neural networks in the plurality trained neural networks, train the specialist neural network using the plurality of calibrated neural networks.

In a further embodiment, to augment the ground truth set of image data, the training device uses a noisy image classification system.

In still another embodiment, the noisy image classification system includes synchronization circuitry to direct a training image source to display a training image, direct a camera to capture image data describing the training image, and direct a training device to store the captured image data with metadata describing the training image.

In a still further embodiment, the medical imaging device is an X-ray.

In yet another embodiment, the medical imaging device is an electrocardiogram machine.

In a yet further embodiment, the investigation recommendation includes a heat map.

In another additional embodiment, the investigation recommendation includes an estimated diagnosis.

In a further additional embodiment, the noisy image classification device is a smartphone.

In another embodiment again, the image data includes a time series of sequential images.

In a further embodiment again, A noisy image classification method, including obtaining image data describing a first image taken of a second image, where the second image was produced by a medical imaging device, and where the first image is a noisy version of the second image using an image classification device, classifying the image data using a neural network trained to be robust to noise using the image classification device, generating an investigation recommendation based on the classification using the image classification device, and providing the investigation recommendation via a display.

In still yet another embodiment, the neural network is a specialist neural network, and the specialist neural network was trained by obtaining a ground truth set of image data, augmenting the ground truth set of image data, training a plurality of neural networks using the augmented set of image data, performing a calibration on neural networks in the plurality trained neural networks, training the specialist neural network using the plurality of calibrated neural networks.

In a still yet further embodiment, augmenting the ground truth set of image data includes using a noisy image classification system.

In still another additional embodiment, the method further includes directing a training image source to display a training image, directing a camera to capture image data describing the training image, and directing a training device to store the captured image data with metadata describing the training image, wherein the training image source, the camera, and the training device are controlled using a synchronization circuitry.

In a still further additional embodiment, the medical imaging device is an X-ray.

In still another embodiment again, the medical imaging device is an electrocardiogram machine.

In a still further embodiment again, the investigation recommendation includes a heat map.

In yet another additional embodiment, the investigation recommendation includes an estimated diagnosis.

In a yet further additional embodiment, the noisy image classification device is a smartphone.

In yet another embodiment again, the image data includes a time series of sequential images.

Additional embodiments and features are set forth in part in the description that follows, and in part will become apparent to those skilled in the art upon examination of the specification or may be learned by the practice of the invention. A further understanding of the nature and advantages of the present invention may be realized by reference to the remaining portions of the specification and the drawings, which forms a part of this disclosure.

BRIEF DESCRIPTION OF THE DRAWINGS

The description and claims will be more fully understood with reference to the following figures and data graphs, which are presented as exemplary embodiments of the invention and should not be construed as a complete recitation of the scope of the invention.

DETAILED DESCRIPTION

The ability to automate radiology image classification is desirable for many reasons. Machine learning techniques can often "notice" cues in medical images that go undetected by human experts, e.g. doctors. Further, automated systems can be used in triage situations where radiologist experts are not readily available to review, and/or can provide a second opinion for radiologists or a tentative diagnosis for non-radiologist clinical practitioners. However, machine learning systems such as neural networks tend to operate with higher accuracy in environments where the inputs are as noiseless as possible. Noise refers to signals in the image that do not convey relevant information and can decrease the accuracy of machine learning systems. For example, a photo of an X-ray film displayed on a light box (e.g. taken with a cell phone camera) may introduce extraneous noise that will negatively impact the classification performance of the machine learning system compared to the performance on a well-prepared digital version of the X-ray image; this can be due to any number of reasons, including, but not limited to, optical flaws in the camera, angle of the camera, glare, the Moiré effect, aliasing, blur, filters, and/or any other noise source that could be introduced.

While embodiments are discussed below with specific respect to neural networks, systems and methods described herein can be applied and/or utilize any of a number of different types of machine learning models. Furthermore, as can be readily appreciated, systems and methods described herein can use and/or be applied to any number of different types of medical images produced by a wide array of medical imaging devices including (but not limited to) PET scans, CT scans, X-rays, MRI scans, and or any other clinical imaging method as appropriate to the requirements of specific applications of embodiments of the invention. Additionally, systems and methods described herein can classify images of medical sensor readouts such as (but not limited to) electrocardiograms (EKG).

Figure 1:
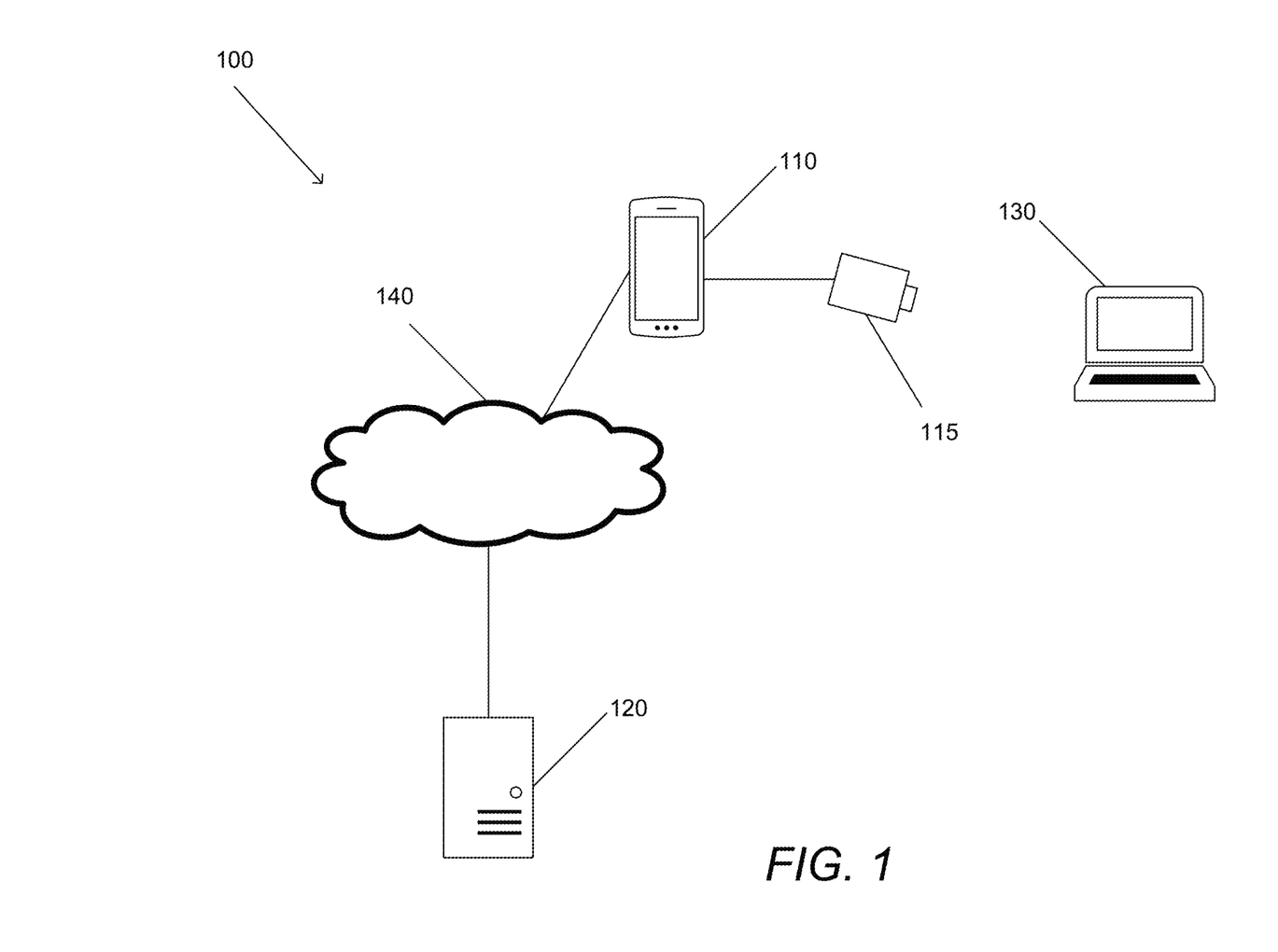
FIG. 1 illustrates a noisy image classification system in accordance with an embodiment of the invention.

Turning now to the drawings, systems and methods are described that can generate augmented training data sets that, when used for training, produce trained neural networks that are robust to noise. "Robust" in this context refers to a state of system performance that is negligibly affected by the introduction of noise into the target imaging classification task. Further, in numerous embodiments, the final trained robust neural network can be made computationally light enough to run on mobile platforms such as cell phones or low-power computers. This can enable users anywhere, even in remote regions or without access to significant computing resources, to utilize the neural network for the classification task Noisy Image Classification Systems Noisy image classification systems are capable of training image classification devices for real world use. Noisy image classification devices can obtain noisy images of clinical images and provide a classification. In some embodiments, the classification includes a prospective diagnosis. In order to robustly train machine learning systems utilized by noisy image classification devices, noisy image classification systems can generate large amounts of training data in a variety of ways. Turning now to FIG. 1, a noisy image classification system in accordance with an embodiment of the invention is illustrated.

System 100 includes a noisy image classification device 110. In numerous embodiments, noisy image classification devices are mobile computing platforms such as, but not limited to, smartphones and tablet computers. However, noisy image classification devices can be any device capable of obtaining a noisy input image and running a noisy image classification application as appropriate to the requirements of specific applications of embodiments of the invention. Noisy image classification devices are communicatively coupled to at least one camera camera 115 (which may be embedded) that enable them to take their own images, which may be noisy for any number of reasons.

System 100 further includes a training device 120. In numerous embodiments, training devices are computing systems that can train neural networks. In many embodiments, training devices are capable of obtaining a base training data set and performing augmentation processes discussed below. System 100 further includes a training image source 130 which can be used to display images for capture by noisy image classification devices. In many embodiments, the noisy image source is a computer display. However, the noisy image source can be any type of display such as digital displays (e.g. televisions, tablet computers, monitors) or "low-tech" displays such as light boxes, printouts, film, and/or any other source as appropriate to the requirements of specific applications of embodiments of the invention. Noisy image classification devices can be trained with photos of training image sources in order to enable them to later operate on similar image sources. As can be readily appreciated, a trained noisy image classification device can operate independently of a noisy image classification system.

Noisy image devices and training devices can be connected via a network. In numerous embodiments, noisy image classification applications can be provided to the noisy image classification device via the network. In numerous embodiments, the network is a composite network made of multiple different types of network. In many embodiments, the network includes wired networks and/or wireless networks. Different network components include, but are not limited to, the Internet, intranets, local area networks, wide area networks, peer-to-peer networks, and/or any other type of network as appropriate to the requirements of specific applications of embodiments of the invention. In various embodiments, the network is facilitated via physical transfer of a computer readable medium. While a specific system is illustrated with respect to FIG. 1, any number of different system architectures can be used, including those that combine training devices and noisy image classification devices on the same platform, those that utilize additional image capture devices to obtain noisy images for noisy image classification devices, and/or any other architectures as appropriate to the requirements of specific applications of embodiments of the invention.

Figure 2:
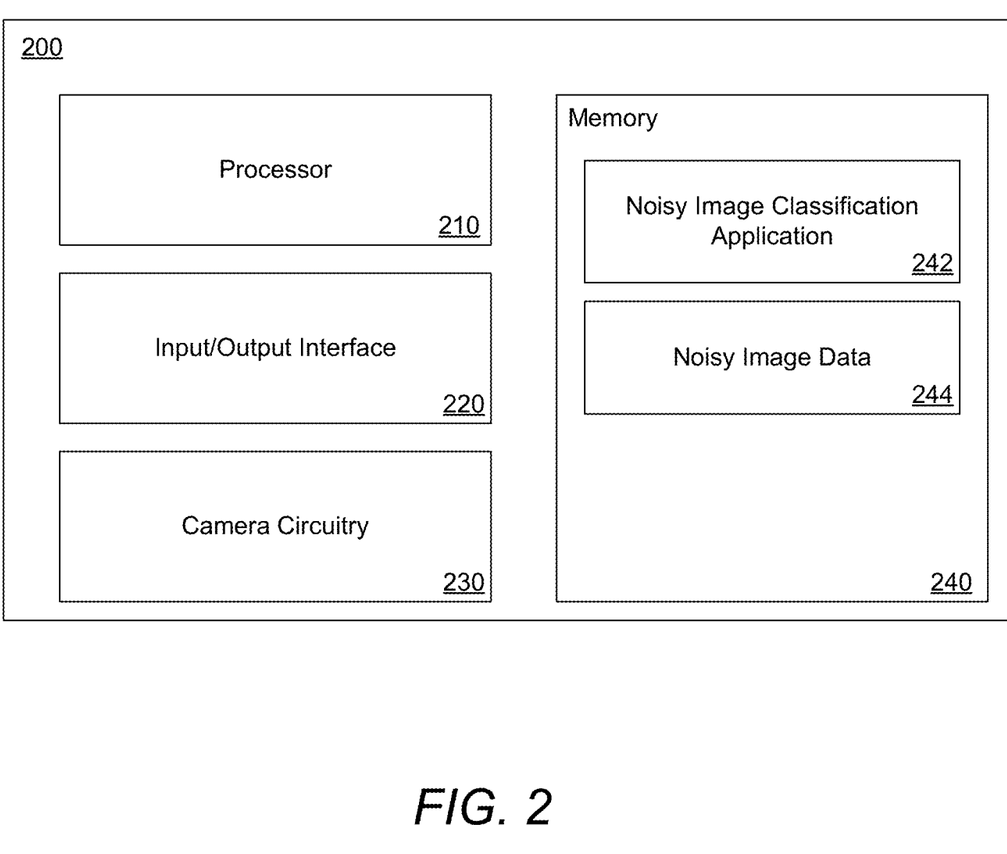
FIG. 2 illustrates a noisy image classification device in accordance with an embodiment of the invention.

Turning now to FIG. 2, a noisy image classification device in accordance with an embodiment of the invention is illustrated. Noisy image classification device 200 includes a processor 210. Processors can be any type of logic processing unit, including, but not limited to, central processing units (CPUs), graphics processing units (GPUs), Application Specific Integrated Circuits (ASICs), Field-Programmable Gate-Arrays (FPGAs), and/or any other processing circuitry as appropriate to the requirements of specific applications of embodiments of the invention. Noisy image classification device 200 further includes an input/output (I/O) interface 220 and camera circuitry 230. I/O interfaces can enable connections with external networks and/or devices as required. In numerous embodiments, the I/O interface connects to a display by which the noisy image classification device can provide data to a user. In a variety of embodiments, the display is integrated into the noisy image classification device, but the display can be an external device instead, or as well. In many embodiments, camera circuitry is capable of obtaining images of radiology images. In many embodiments, the obtained images are noisy by at least the merits of being a photograph of an image. However, the optical stack utilized by the camera circuity may introduce noise into captured images as well. In a variety of embodiments, the camera circuitry is not included, and image data is obtained from an external camera circuitry via the I/O interface.

Noisy image classification device 200 further includes a memory 240. Memory can be any type of computer readable medium, including, but not limited to, volatile memory, non-volatile memory, a mixture thereof, and/or any other memory type as appropriate to the requirements of specific applications of embodiments of the invention. Memory 240 contains a noisy image classification application 242, and noisy image data 244. In numerous embodiments, noisy image classification applications direct the processor to classify the images described by the noisy image data. In many embodiments, the noisy image data describes images of radiology images. In numerous embodiments, the noisy image date describes images of other medical sensor outputs. In a variety of embodiments, classification involves detecting, localizing, and/or describing medical conditions such as, but not limited to, lesions, tumors, and/or any other medically relevant descriptor as appropriate to the requirements of specific applications of embodiments of the invention. In numerous embodiments, a training device may similarly contain a processor and a memory, as well as an application for augmenting training data and/or training a neural network using augmented training data. As can be readily appreciated, a trained noisy image classification device can operate independently without a training Processes for augmenting training data and training neural networks are described below.

Augmenting Training Data and Training Noisy Image Classifiers

In many embodiments, proper training data for use in training neural networks is treated as the ground truth, and so must in fact be highly accurate. Systems and methods described herein can obtain training data sets that are highly accurate, and augment them with synthetic training data which also has a high degree of accuracy. This augmented training data can be used by training devices to train neural networks that are robust to noise. It is important to note that while static training images and classification of static noisy images are predominantly discussed, as can be readily appreciated, video (e.g. a time series of multiple sequential static images) can be classified using similar systems and methods without departing from the scope or spirit of the invention.

Figure 3:
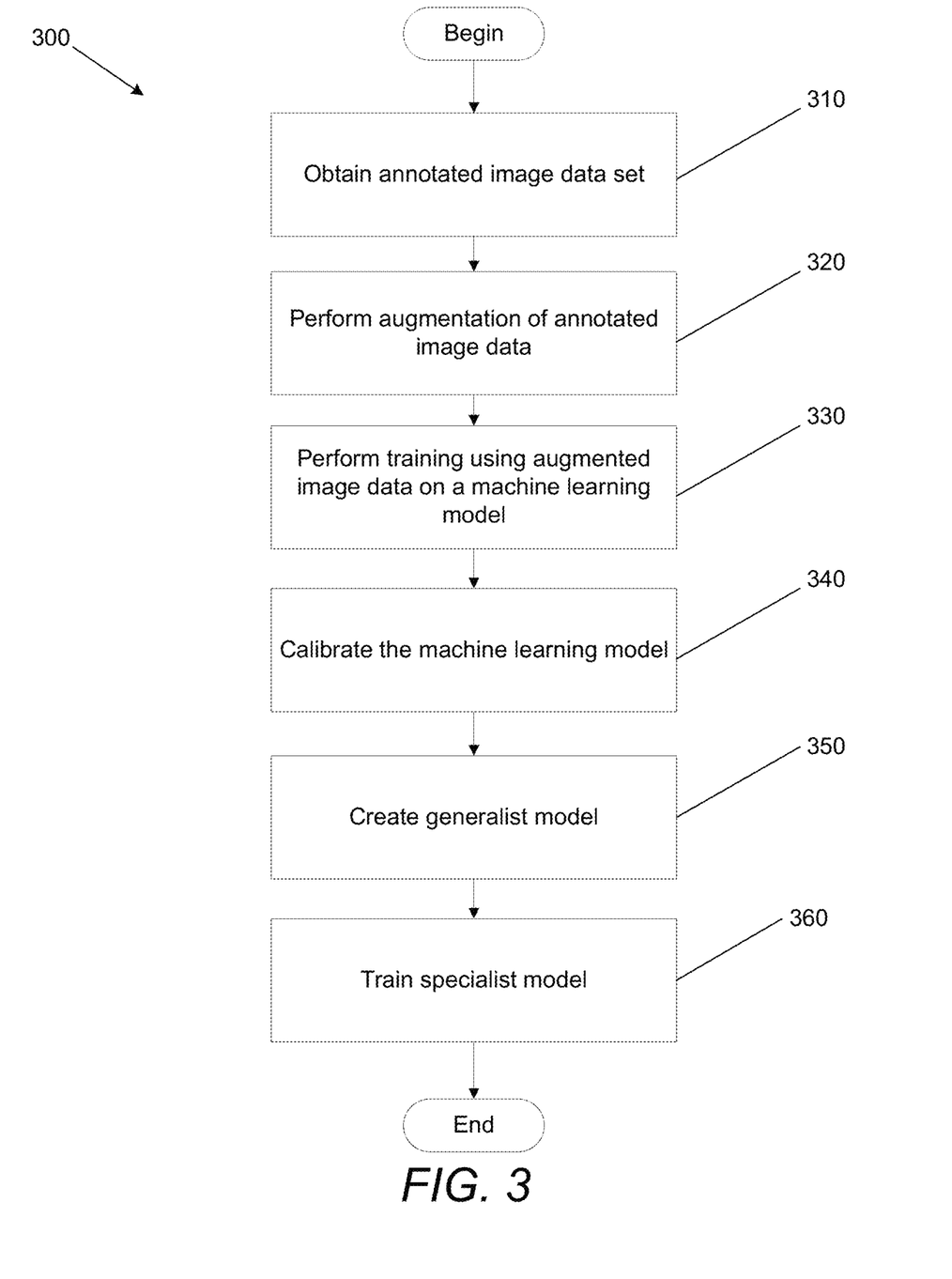
FIG. 3 is a flow chart illustrating a process for training a neural network to classify noisy images in accordance with an embodiment of the invention.
Figure 4:
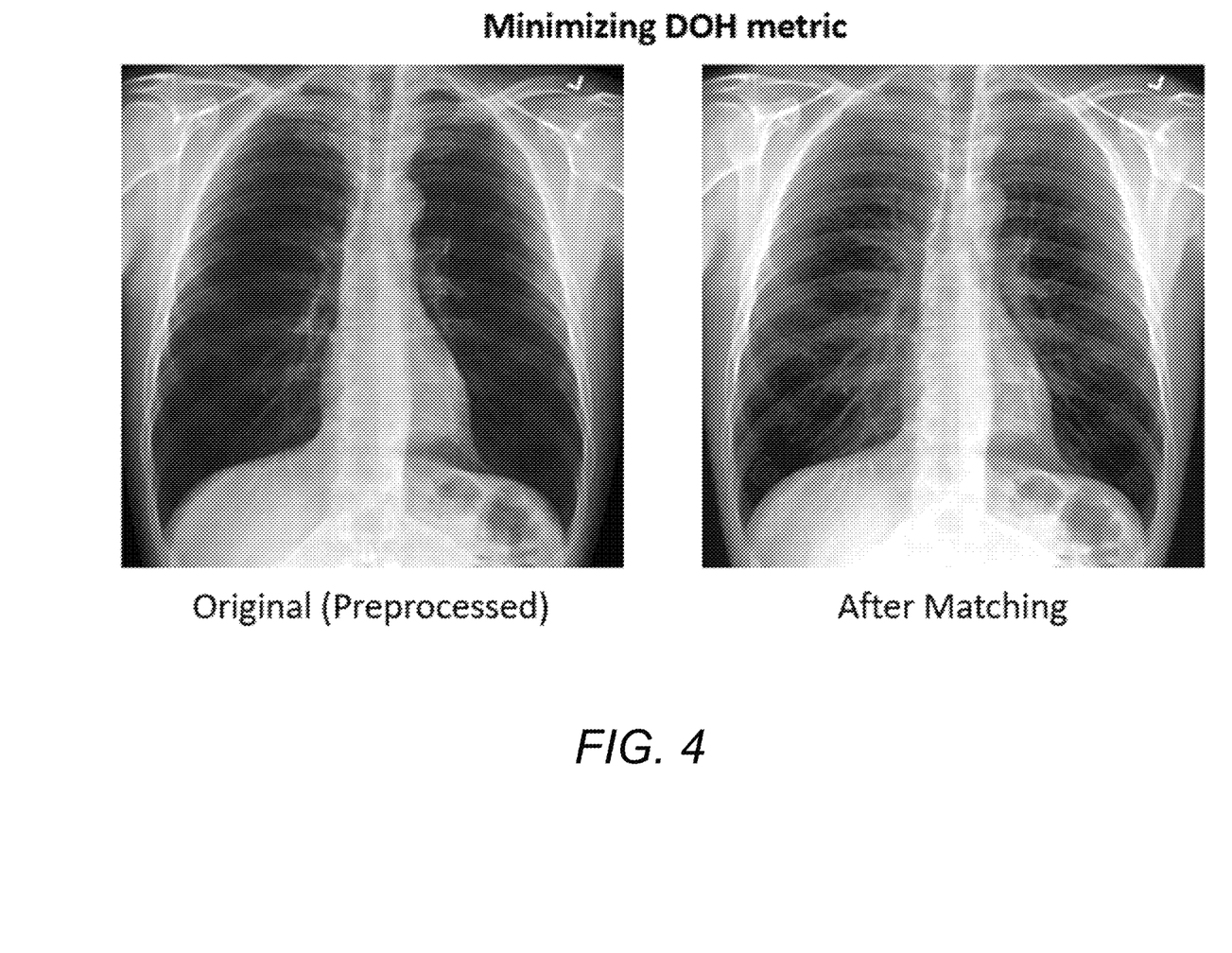
FIG. 4 illustrates example results of histogram equalization in accordance with an embodiment of the invention.

Turning now to FIG. 3, a process for augmenting and training a noisy image classifier in accordance with an embodiment of the invention is illustrated. Process 300 includes obtaining (310) an annotated image data set. In numerous embodiments, the annotated image data set contains ground truth radiology images. In a variety of embodiments, the ground truth radiology images are of high quality, such as, but not limited to, those obtained directly from a radiology imaging device. In many embodiments, the ground truth images are converted to greyscale in order to reduce the feature space. In a variety of embodiments, histogram equalization is performed to preprocess the image data in order to make features more visible. An example result of a histogram equalization process in accordance with an embodiment of the invention is illustrated in FIG. 4.

Figure 5:
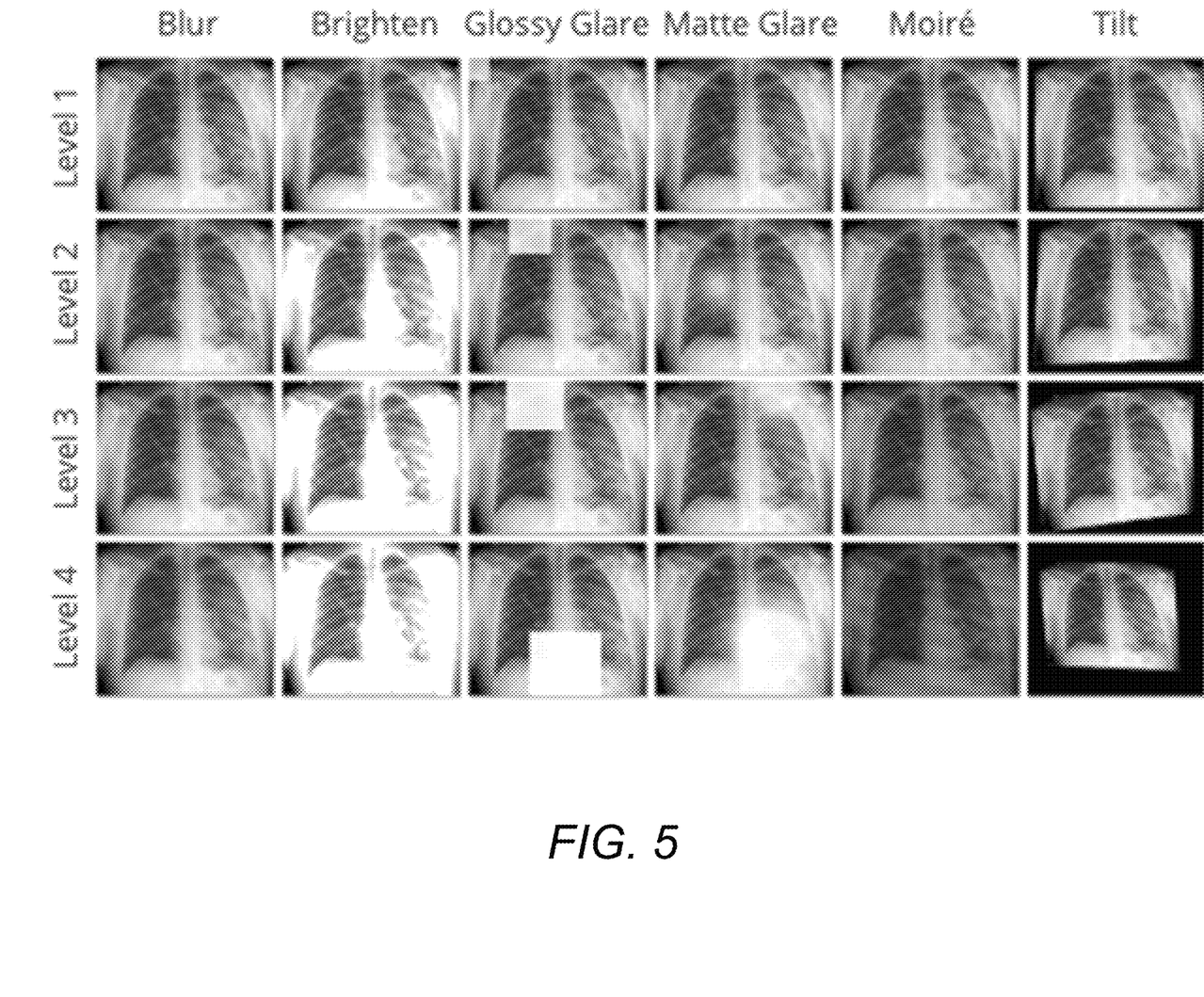
FIG. 5 illustrates example synthetically augmented image data in accordance with an embodiment of the invention.

Augmentation of the annotated ground truth image data set is performed (320). In numerous embodiments, the augmentations are synthetic. Synthetic augmentations can include, but are not limited to, applying filters to introduce noise to the image data set. Filters can include, but are not limited to, warps, angle changes, contrast adjustments, brightness adjustments, adding Moiré effect, and/or any other noise-introducing filter as appropriate to the requirements of specific applications of embodiments of the invention. An example of synthetically augmented image data in accordance with an embodiment of the invention is illustrated in FIG. 5.

Synthetic augmentation can also include synthetic generation of completely new image data, i.e. image data not resulting from a filtered base image. In numerous embodiments, generative models such as, but not limited to, generative adversarial networks (GANs) are used to generate completely synthetic augmented image data.

Figure 6:
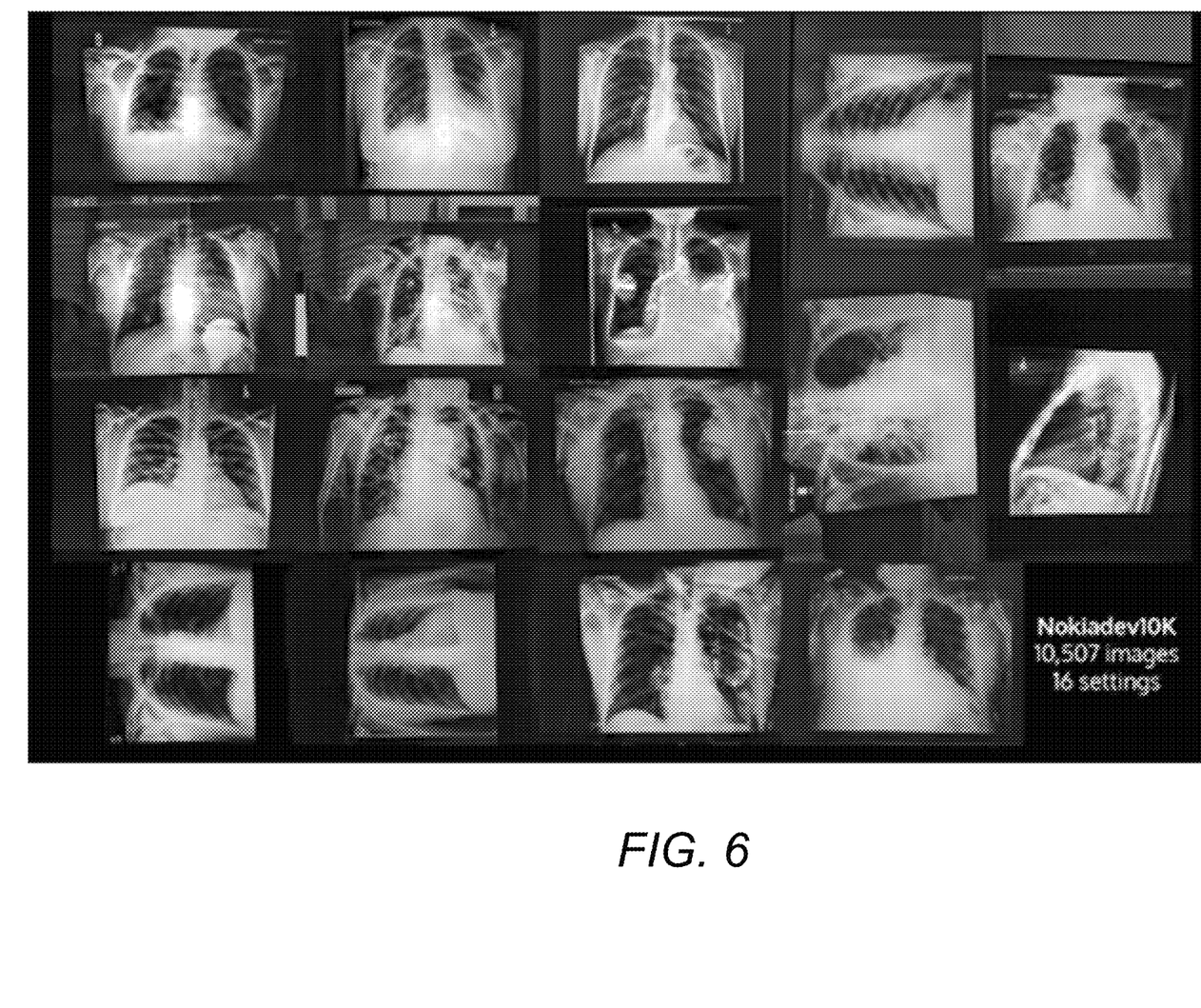
FIG. 6 illustrates example images captured using a noisy image classification system in accordance with an embodiment of the invention.

In many embodiments, the augmentation process involves generation of new training data that is itself noisy. For example, in numerous embodiments, an noisy image classification systems can be used where a camera is pointed towards a training image source to take a large number of photos of radiology images that are then labeled and introduced into the training data set. In many embodiments, this process can be automatically performed controlling the camera and training image source using synchronization circuitry that triggers a new image to appear on the noisy image source, triggers a photo of the display to be taken, and stores the image with metadata identifying the displayed image. This process can be performed indefinitely until sufficient annotated image data has been obtained. In many embodiments, the synchronization circuitry is implemented using software on the training device. Example images captured using a noisy image classification system in accordance with an embodiment of the invention is illustrated in FIG. 6.

In numerous embodiments, any combination of synthetically augmented, synthetically generated, and/or image data created using an automated noisy image capture process as discussed above can be used to cross validate data. For example, given a ground truth image, a synthetic version altered via a filter introducing tilt and a version of the ground truth image captured via an automated noisy image capture system adjusted such that the camera introduces tilt can be compared to confirm that the augmentation process worked properly. It is to be understood that any number of cross-validations between any type of augmented training data can be applied as appropriate to the requirements of specific applications of embodiments of the invention.

A machine learning model is then trained (330) using the augmented training data. In various embodiment, the machine learning model is a convolutional neural network. However, as can be readily appreciated, any number of different machine learning models such as (but not limited to) those with dense and/or residual connections (e.g. DenseNets and ResNets), can be used as appropriate to the requirements of specific applications of embodiments of the invention. In many embodiments, the training process includes stability training processes. In numerous embodiments, stability training processes involve applying a loss function. In a variety of embodiments, a stability training process similar to the one described in "Improving the Robustness of Deep Neural Networks via Stability Training" to Zheng et al., arXiv:1604.04326v1, the entirety of which is incorporated herein by reference. However, any number of different stability training methods and/or loss functions can be utilized as appropriate to the requirements of specific applications of embodiments of the invention.

The machine learning model is then calibrated (340). In many embodiments, calibration includes shifting model probabilities using a regression to move thresholds closer to 0.5 in order to give a smoother distribution. In many embodiments, the regression is a logistic regression such as, but not limited to, Platt scaling, isotonic regression, and/or any other calibration technique as appropriate to the requirements of specific applications of embodiments of the invention.

A "generalist" model can be created (350) by repeating the above process to generate many different trained neural networks which are then aggregated into an ensemble. In many embodiments, generalist models are more accurate than any single model that makes up the ensemble across the average scope of operation. However, in a variety of embodiments, generalist models are computationally intensive, and therefore not well suited to lower computational power devices. A "specialist" model can be trained (360) from the generalist model by training a neural network to produce the same outputs as the generalist. In this way, the specialist model is removed an additional step from the training data, but operates as a single model that is light weight enough to operate on low computing power devices while inheriting the generalist models' robustness to noise. Specialists and/or generalist models can similarly be convolutional neural networks, which can have dense and/or residual connections.

Figure 7:
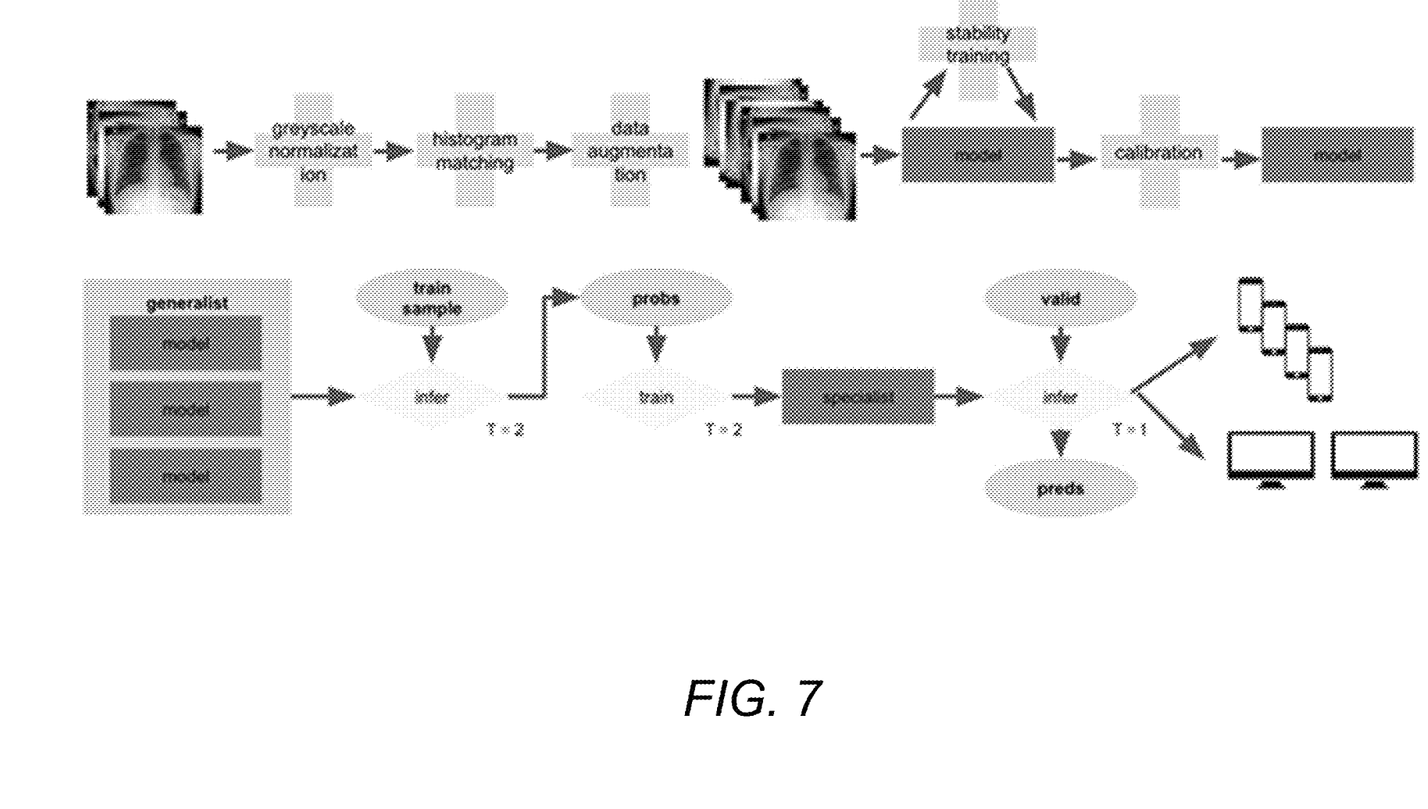
FIG. 7 is a block diagram conceptually illustrating a process for training and deploying a neural network to classify noisy images in accordance with an embodiment of the invention.

While a specific process to training a noisy image classifier in accordance with an embodiment of the invention is illustrated in FIG. 3, any number of different process, including, but not limited to, those that utilize different combinations, more, or fewer types of augmented training data, can be utilized as appropriate to the requirements of specific applications of embodiments of the invention. A block diagram of a similar training process in accordance with an embodiment of the invention is illustrated in FIG. 7. Once generated, the specialist model can be embedded into a noisy image classification application and used to classify noisy images.

Figure 8:
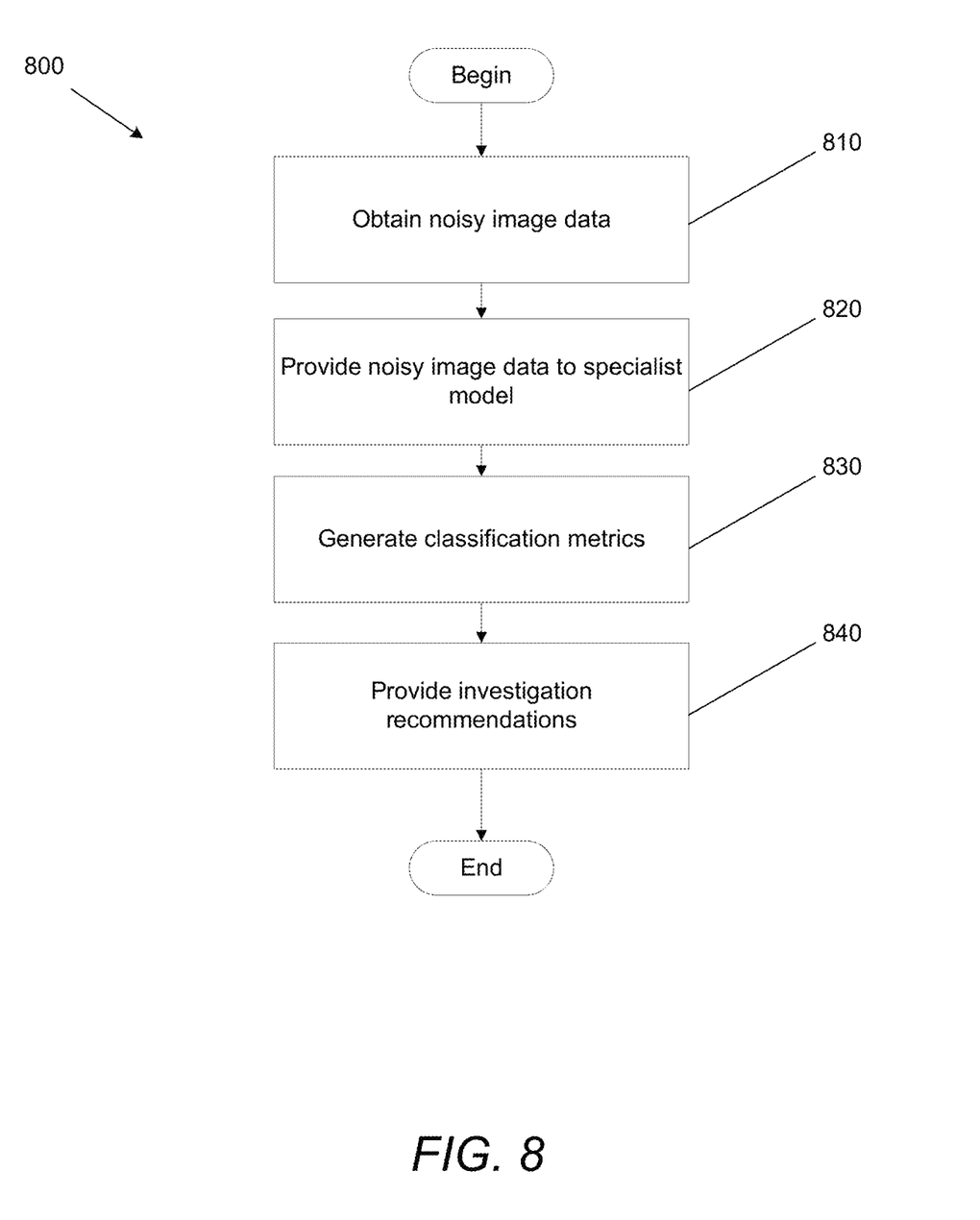
FIG. 8 is a flow chart illustrating a process for using a noisy image classification device to classify images in accordance with an embodiment of the invention.

Turning now to FIG. 8, a process for using an noisy image classification application in accordance with an embodiment of the invention is illustrated. Process 900 includes obtaining (810) noisy image data. In numerous embodiments, the noisy image data is a photo of a radiology image. However, while the context of radiology images is utilized herein to enhance understanding, one of ordinary skill in the art can appreciate that any type of noisy image can be classified as appropriate to the requirements of specific applications of embodiments of the invention. The noisy image data is provided (820) to a specialist model which generates (830) classification metrics. Classification metrics can include, but are not limited to, confidence values reflecting the confidence that a given identified object exists at a particular location. However, location and/or labeling of objects are not required. In many embodiments, classified images and/or the originally obtained noisy image data can be added to the training data set.

Figure 9:
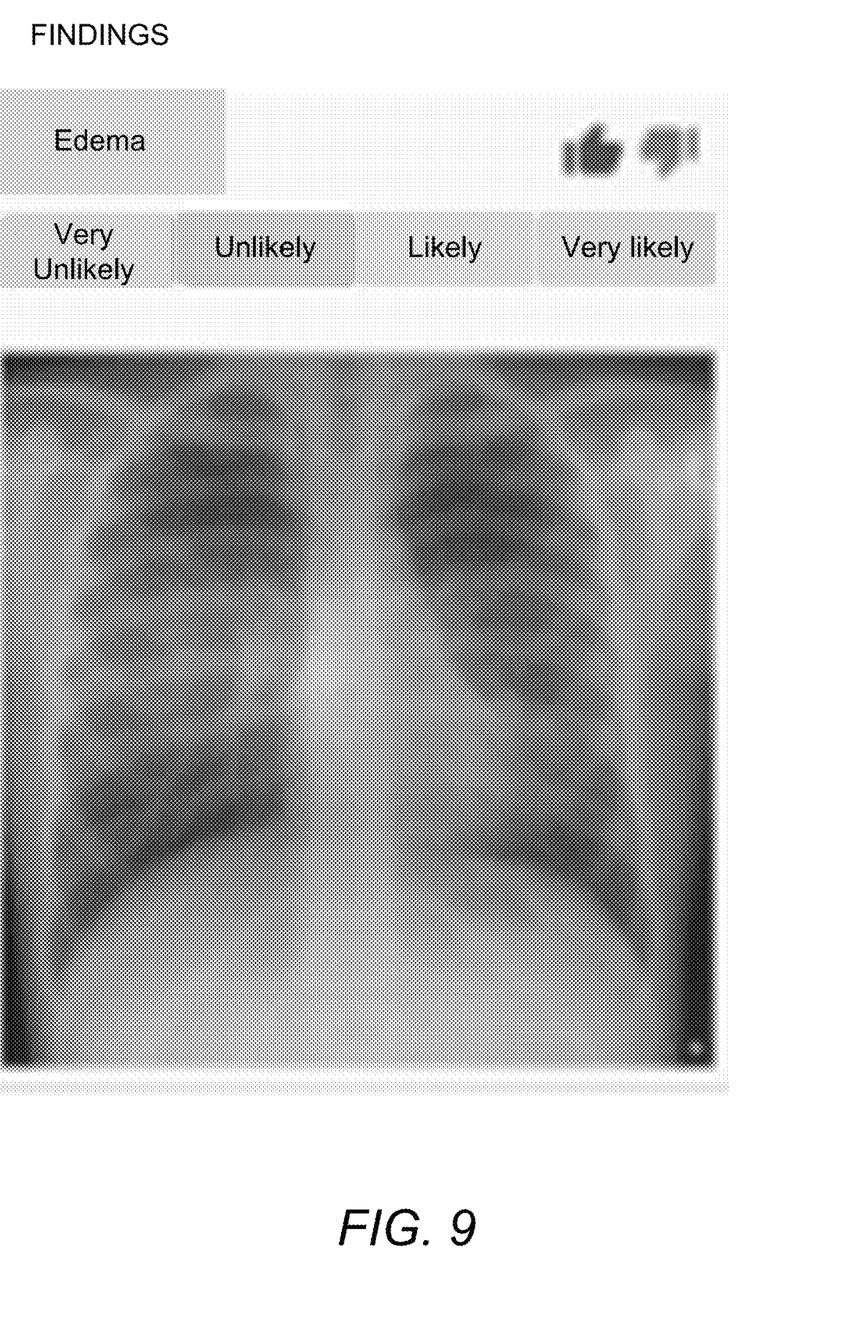
FIG. 9 is an example investigation recommendation in accordance with an embodiment of the invention.

Investigation recommendations can then be provided (840). In numerous embodiments, investigation recommendations are based on the classification metrics, such as, but not limited to, heat maps, labeled versions of the image, labeled versions of a filtered version of the image, an estimated diagnosis of the patient, and/or any other human-understandable visualization as appropriate to the requirements of specific applications of embodiments of the invention. An example investigation recommendation in accordance with an embodiment of the invention is illustrated in FIG. 9. As can be readily appreciated, the display style is arbitrary and any number of different presentation styles can be used as appropriate to the requirements of specific applications of embodiments of the invention.

Although specific systems and methods for generating noisy image classifiers are discussed above, many different methods and system architectures can be implemented in accordance with many different embodiments of the invention. It is therefore to be understood that the present invention may be practiced in ways other than specifically described, without departing from the scope and spirit of the present invention. Thus, embodiments of the present invention should be considered in all respects as illustrative and not restrictive. Accordingly, the scope of the invention should be determined not by the embodiments illustrated, but by the appended claims and their equivalents.

What is claimed is:

1. A noisy image classification device, comprising:
   a processor;
   camera circuitry; and
   a memory containing a noisy image classification application, where the noisy image classification application directs the processor to:
   obtain image data describing a first image taken of a second image using the camera circuitry, where the second image was produced by a medical imaging device, and where the first image is a noisy version of the second image;
   classify the image data using a neural network trained to be robust to noise, where the neural network was trained using a training device directed to:

obtain a ground truth set of image data;
augment the ground truth set of image data;
train a plurality of neural networks using the augmented set of image data;
perform a calibration on neural networks in the plurality trained neural networks; and
train a specialist neural network using the plurality of calibrated neural networks;
generate an investigation recommendation based on the classification; and
provide the investigation recommendation via a display.

2. The noisy image classification device of claim 1, wherein to augment the ground truth set of image data, the training device uses a noisy image classification system.

3. The noisy image classification device of claim 2, wherein the noisy image classification system comprises synchronization circuitry to:
direct a training image source to display a training image;
direct a camera to capture image data describing the training image; and
direct a training device to store the captured image data with metadata describing the training image.

4. The noisy image classification device of claim 1, wherein the medical imaging device is an X-ray.

5. The noisy image classification device of claim 1, wherein the medical imaging device is an electrocardiogram machine.

6. The noisy image classification device of claim 1, wherein the investigation recommendation comprises a heat map.

7. The noisy image classification device of claim 1, wherein the investigation recommendation comprises an estimated diagnosis.

8. The noisy image classification device of claim 1, wherein the noisy image classification device is a smartphone.

9. The noisy image classification device of claim 1, wherein the image data comprises a time series of sequential images.

10. The noisy image classification device of claim 1, wherein the training device is further directed to:
aggregate the plurality of calibrated neural networks into an ensemble network; and
train the specialist neural network using the ensemble network.

11. A noisy image classification method, comprising:
obtaining image data describing a first image taken of a second image, where the second image was produced by a medical imaging device, and where the first image is a noisy version of the second image using an image classification device;
classifying the image data using a neural network trained to be robust to noise using the image classification device, where the specialist neural network was trained by:
obtaining a ground truth set of image data;
augmenting the ground truth set of image data;
training a plurality of neural networks using the augmented set of image data;
performing a calibration on neural networks in the plurality trained neural networks; and
neural networks;
training a specialist neural network using the plurality of calibrated neural networks;
generating an investigation recommendation based on the classification using the image classification device; and
providing the investigation recommendation via a display.

12. The noisy image classification method of claim 11, wherein augmenting the ground truth set of image data comprises using a noisy image classification system.

13. The noisy image classification method of claim 12, further comprising:
directing a training image source to display a training image;
directing a camera to capture image data describing the training image; and
directing a training device to store the captured image data with metadata describing the training image;
wherein the training image source, the camera, and the training device are controlled using a synchronization circuitry.

14. The noisy image classification method of claim 11, wherein the medical imaging device is an X-ray.

15. The noisy image classification method of claim 11, wherein the medical imaging device is an electrocardiogram machine.

16. The noisy image classification method of claim 11, wherein the investigation recommendation comprises a heat map.

17. The noisy image classification method of claim 11, wherein the investigation recommendation comprises an estimated diagnosis.

18. The noisy image classification method of claim 11, wherein the noisy image classification device is a smartphone.

19. The noisy image classification method of claim 11, wherein the image data comprises a time series of sequential images.

20. The noisy image classification method of claim 11, further comprising:
aggregating the plurality of calibrated neural networks into an ensemble network; and
training the specialist neural network using the ensemble network.

* * * * *